US009280810B2

(12) United States Patent
Stec et al.

(10) Patent No.: US 9,280,810 B2
(45) **Date of Patent: *Mar. 8, 2016**

(54) METHOD AND SYSTEM FOR CORRECTING A DISTORTED INPUT IMAGE

(71) Applicant: FotoNation Limited, Ballybrit, Galway (IE)

(72) Inventors: Piotr Stec, Ballybrit (IE); Alexei Pososin, Galway (IE); Mihai Constantin Munteanu, Bucharest (RO); Corneliu Zaharia, Brasov (RO); Vlad Georgescu, Brasov (RO)

(73) Assignee: FotoNation Limited, Ballybrit, Galway (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/728,939

(22) Filed: Jun. 2, 2015

(65) Prior Publication Data

US 2015/0262344 A1 Sep. 17, 2015

Related U.S. Application Data

(63) Continuation-in-part of application No. 14/579,771, filed on Dec. 22, 2014, which is a continuation of application No. 13/541,650, filed on Jul. 3, 2012, now Pat. No. 8,928,730.

(51) Int. Cl.
*G06T 5/00* (2006.01)
*H04N 5/232* (2006.01)

(52) U.S. Cl.
CPC ............ *G06T 5/006* (2013.01); *H04N 5/23229* (2013.01); *G06T 2207/10004* (2013.01); *G06T 2207/20021* (2013.01)

(58) Field of Classification Search
CPC ............ H04N 5/23238; H04N 5/2628; H04N 5/2259; H04N 5/2254; H04N 5/2257; H04N 5/265; H04N 7/181; H04N 5/23229; H04N 5/23241; H04N 5/23293; H04N 5/2624; H04N 5/33; H04N 5/335; H04N 7/18; H04N 13/0239; H04N 13/0296; H04N 17/002; G06T 3/4038; G02B 13/06
See application file for complete search history.

(56) References Cited

U.S. PATENT DOCUMENTS 5,594,363 A * 1/1997 Freeman .......... H03K 19/17736 326/39
6,219,099 B1 * 4/2001 Johnson .................. H04N 9/12 348/383
8,903,468 B2 * 12/2014 Peyman ............. A61F 9/00821 600/407
2003/0002734 A1 * 1/2003 Islam ..................... H04N 19/63 382/166
2005/0084175 A1 * 4/2005 Olszak ................. G06T 3/4038 382/284

(Continued)

*Primary Examiner* — Sath V Perungavoor
*Assistant Examiner* — Howard D Brown, Jr.
(74) *Attorney, Agent, or Firm* — Hickman Palermo Becker Bingham LLP

(57) ABSTRACT

A method for correcting a distorted input image comprises determining a local region of an image to be displayed and dividing said region into an array of rectangular tiles, each tile corresponding to a distorted tile with a non-rectangular boundary within said input image. For each tile of the local region, maximum and minimum memory address locations of successive rows of said input image sufficient to span said boundary of said distorted tile are determined. Successive rows of the distorted input from between said maximum and minimum addresses are read. Distortion of the non-rectangular portion of said distorted input image is corrected to provide a tile of a corrected output image which is stored.

17 Claims, 11 Drawing Sheets

(56) References Cited

U.S. PATENT DOCUMENTS

2010/0002071 A1* 1/2010 Ahiska .................. H04N 5/217 348/36
2012/0249727 A1* 10/2012 Corcoran .............. G06T 3/0062 348/36
2012/0249841 A1* 10/2012 Corcoran ............... H04N 5/217 348/241
2014/0009568 A1* 1/2014 Stec ........................ G06T 5/006 348/36
2015/0178897 A1 6/2015 Stec et al.
2015/0262344 A1* 9/2015 Stec ........................ G06T 5/006 382/275

* cited by examiner

Coordinates found by the Edge Tracer

Each of these pixels must be the center of a 4x4 area

Shaded area is added by the Tile Border Extender

METHOD AND SYSTEM FOR CORRECTING A DISTORTED INPUT IMAGE

BENEFIT CLAIM

This application claims the benefit under 35 U.S.C. §120 as a continuation in part of application Ser. No. 14/579,771, filed Dec. 22, 2014, which is a continuation of application Ser. No. 13/541,650, filed Jul. 3, 2012, now U.S. Pat. No. 8,928,730 B2, the entire contents of which are hereby incorporated by reference for all purposes as if fully set forth herein. The applications hereby rescind any disclaimer of claim scope in the parent applications or the prosecution history thereof and advise the USPTO that the claims in the application may be broader than any claim in the parent applications.

FIELD

This invention relates to a method and system for correcting a distorted input image.

BACKGROUND

FIG. 1 shows an exemplary Wide Field of View (WFOV) lens system. Such lens systems, nominally have a hemispherical field of view mapped to a planar image sensor for example as shown in FIG. 2.

It will be appreciated that this mapping results in variations in acquired image distortion and resolution across the field of view. It can be desirable to correct for this distortion so that for example, features such as faces especially those located towards the periphery of the field of view do not appear distorted when displayed.

Separately, it is appreciated that such WFOV systems especially introduce heavy and in some cases non-uniform distortion patterns across the field of view so that acquired images (or indeed different colour planes of an acquired image) do not uniformly conform to the ideal mapping shown in FIG. 2. Thus, again it can be desirable to correct for this distortion.

U.S. Pat. No. 5,508,734 discloses a WFOV lens assembly designed to optimize the peripheral regions of the field of view to provide improved resolution matching between the peripheral region relative to a central region, the peripheral region tending to have a lower resolution than the central region.

Referring to FIG. 3, applications such as PCT/EP2011/052970 (Our Ref: P100750pc00/FN-353-PCT) and U.S. application Ser. No. 13/077,891 (Ref: FN-369A-US) disclose digital image acquisition devices including WFOV lens systems. Here, distorted WFOV images are read from a sensor via an imaging pipeline which can carry out simple pre-processing of an image, before being read across a system bus into system memory.

Such systems can employ hardware modules or sub-modules also connected directly or indirectly to the system bus for reading successive images stored in system memory from the bus and for processing the image before either returning the processed image to system memory or forwarding the processed image for further processing. In FIG. 3, for example, a WFOV correction module successively reads distorted images or image portions and provides corrected images or image portions to a face detection (FD) and tracking module.

A system controller controls the various hardware modules, the system controller being responsive to, for example, commands received through a control interface from, for example, software applications running on the device with which a user interacts. In FIG. 3, a zoom and pan module is connected to the controller and this in turn communicates with the WFOV correction module to determine which part of an acquired image needs to be read from system memory for correction and for example, display on the device viewfinder (not shown) and/or forwarding to the face detection module. In this case, a mixer module, for example, superimposes boundaries around faces which have been detected/tracked for display on the device viewfinder.

US 2010/0111440, Chai discloses a distortion correction module which partitions coordinate points in a selected output image into tiles. The output image is an undistorted rendition of a subset of the lens-distorted image. Coordinate points on a border of the tiles in the output image are selected. For each tile, coordinate points in the lens-distorted image corresponding to each selected coordinate point in the output image are calculated. In addition, for each tile, a bounding box on the lens-distorted image is selected. The bounding box includes the calculated coordinates in the lens-distorted image. The bounding boxes are expanded so that they encompass all coordinate points in the lens-distorted image that map to all coordinate points in their respective corresponding tiles. Output pixel values are generated for each tile from pixel values in their corresponding expanded bounding boxes.

In modern high definition image acquisition devices, enormous amounts of information are received and transmitted across the system bus at high frame acquisition speeds. This places pressure on the many processing modules, such as the correction modules of FIG. 3 and Chai which are connected to the system bus to ensure their demands on the system bus are within an allocated budget and so do not interfere with other processing, but also that the processing modules themselves are implemented with the minimal hardware footprint so as to minimize device production costs.

Part of any correction module footprint is cache memory. On the one hand it is desirable to minimize cache size to minimize device cost, yet on the other hand, it is desirable to minimize I/O access by hardware modules across the system bus. So for example, where multiple forms of distortion are to be corrected, it would not be possible or acceptable to successively read from, correct and write back to memory an image for each form of distortion to be corrected.

Separately, it will be appreciated that WFOV lens systems as well as being incorporated into hand-held digital image acquisition devices can be included in devices with various specialist applications, for example, fixed security cameras. In some cases, for example, an overhead camera mounted towards a centre of a ceiling in a room might have a lens system which primarily emphasizes the circumferential field of view of the room and acquires relatively little detail in the region immediately below the camera.

When a person walks across such a room they move closer to the camera, but the angle of incidence of their face to the camera means the camera view of their face becomes less frontal possibly making it more difficult for the camera to track and/or recognise the person's face. In a case such as this, as well as correcting for the distortion introduced by the non-linear mapping of the circumferential view of the room onto the planar surface of the acquisition system imaging sensor, it may be desirable to adjust either the sensor, or lens angle to improve the view of a target person (clearly involving some loss resolution in other regions of the field of view).

Depending on the nature of the lens assembly, it may be preferable to tilt the lens, rather than the sensor. However, if the lens is a large optical assembly, for example, for providing long-range optical quality for security applications, then it could also be desirable to tilt the image sensor assembly, as indicated by the arrows of FIG. 1, to optimize the view of a person's face as they approach the camera. This tilting of the sensor introduces additional distortion into the image over that of the non-linear optical structure of the lens.

It will also be appreciated that as a person approaches the camera, their face will become elongated towards the chin and bulbous towards the top of the head. It may be thus desirable to counter this non-linear distortion of the person's face.

From the foregoing, it is clear that several different distortions occur as a person walks across the field of view (FOV) towards the lens assembly: (i) a non-linear lens distortion which can be a function of the location within the FOV of the lens; (ii) distortion due to possible relative movement of the lens and sensor surfaces; and (iii) distortion effects in local areas such as faces which vary according to both the vertical and horizontal distance from the camera unit.

Other distortions "rolling shutter" distortion and again caused by movement within the field of view while an image is being read from a sensor—thus without correcting for this distortion, portions of an image can appear wrongly shifted related to others.

In other applications, it may be desirable to flip an acquired image before it is displayed and again this can be considered as a form of distortion which needs to be corrected.

It is an object of the present invention to provide an improved correction module for a digital image acquisition device addressing the above problems.

SUMMARY

According to a first aspect, there is provided an image acquisition system as claimed in claim 1.

In a second aspect, there is provided a method for correcting a distorted image as claimed in claim 6.

Embodiments of the present invention obtain a locally uniform image frame by dynamically adjusting a mapping between rectangular grid regions within a desired view to be presented on a display, or otherwise stored for viewing and the actual sensor surface. This mapping can change from frame to frame and indeed within a frame and is driven both by the relative position of a moving target relative to the image acquisition device as well as through user interaction with a camera application for example, determining a size of a region of interest (ROI) within a field of view i.e. zooming in on a field of view.

Embodiments of the invention provide a distortion adjusting engine which copes with multiple sources of distortion and which can dynamically adjust the overall mapping of pixels from the sensor surface to generate the final rectilinear grid of display pixels on an output display or for storing or compressing into a conventional video format.

BRIEF DESCRIPTION OF THE DRAWINGS

An embodiment of the invention will now be described, by way of example, with reference to the accompanying drawings, in which:

FIG. 7(*b*) shows an example of a tile transformed according to an embodiment of the present invention;

FIG. 7(*c*) show an example of Bresenham's line algorithm for determining pixels lying along the border of a tile;

FIG. 7(*d*) shows how a tile border produced using the algorithm of FIG. 7(*b*) is extended;

DESCRIPTION OF THE PREFERRED EMBODIMENT

Figure 4:
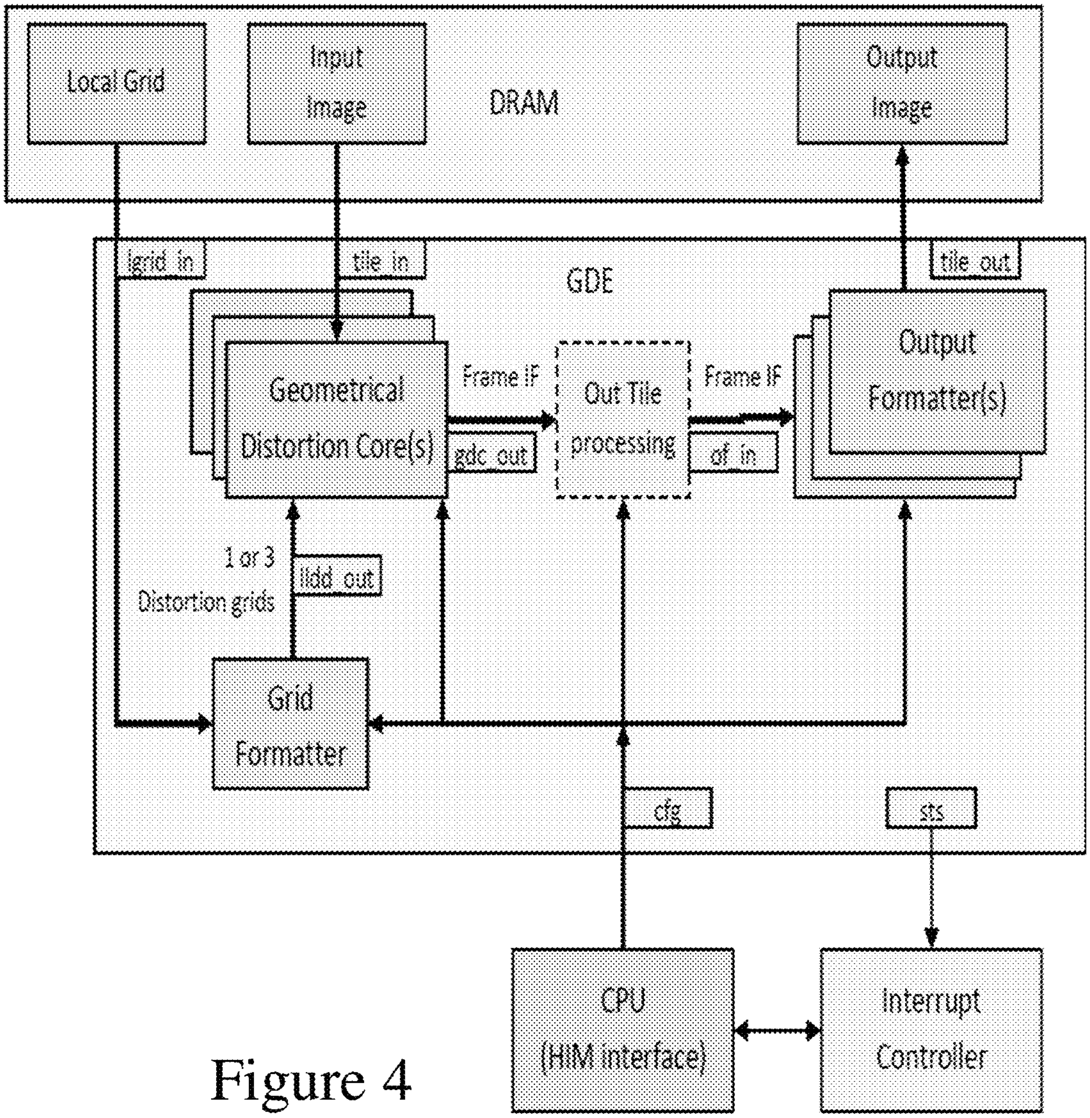
FIG. 4 shows schematically a geometrical distortion engine (GDE) according to an embodiment of the present invention.

Referring now to FIG. 4, the basic structure of an engine for handling geometrical distortion within images in a digital image acquisition device according to an embodiment of the present invention is shown. As will be explained in detail below, the Geometrical Distortion Engine (GDE) is capable of effectively removing distortions introduced by for example, a WFOV lens system, but also for compensating for distortion caused by for example, camera shake, and for correcting distortion introduced by a device user through interaction with an application running on or in communication with the acquisition device. Such user-defined distortion can require an affine transformation, colour transformation or image morphing to apply particular effects to the image and indeed sequence of images being acquired by the device.

In the embodiment, distortion processing on each color plane of an image, for example RGB, YUV or LAB is independent of the others, and so within the GDE, a single geometrical distortion core (GDC) processes only one color plane, so providing greater flexibility at the system level. A single GDC can process each color plane sequentially or more instances of GDC (such as shown in FIG. 4) can process all planes of an image at the same time.

In the present specification, the term grid is used to refer to an array of tiles. Each tile is defined by its four corners and these are referred to as nodes. A transformation maps the coordinates of nodes within a grid according to a given distortion to be corrected.

The GDC processes an input image plane tile by tile under the control of a Grid Formatter Unit (GFU). The GDC fetches input tiles (tile_in) from the DRAM according to the addresses provided by the GFU and processes them, producing the corrected pixels for respective output tiles (gdc_out) in normal raster order.

Typically, in prior art systems such as Chai, information for each distorted tile of the input image is read in rectangular blocks from DRAM, each rectangular block bounding a distorted tile. However, as can be appreciated, for a heavily distorted input image tile, this can mean that quite a lot of information is read from DRAM across the system bus and is then not used in mapping the distorted input image tile (tile_in) to the output image tile (gdc_out).

In embodiments of the present invention, only the information required for correcting a given distorted tile of the input image is read from memory into a tile cache (FIG. 8) of the GDC. Thus, the four nodes defined for each tile to be read from DRAM do not define a rectangle—they define a polygon which in turn is used to determine the image information read from DRAM for a tile.

In embodiments of the invention, the distortion function applied by the GDC to each tile is not alone governed by the need to correct for WFOV lens system distortion, but also for other distortion effects which can include camera shake, user defined distortion and lens-sensor misalignment (sensor tilt).

As will be described in more detail in relation to FIG. 6, the GFU combines local grid information taken from DRAM, an affine transformation matrix and global grid information and produces the Low Level Distortion Descriptors (LLDD) for each tile of the grid from within a sensed image which is to be processed by the or each GDC. These descriptors are employed by the or each GDC to read correct image tile information from memory and to correct the image tile.

Figure 3:
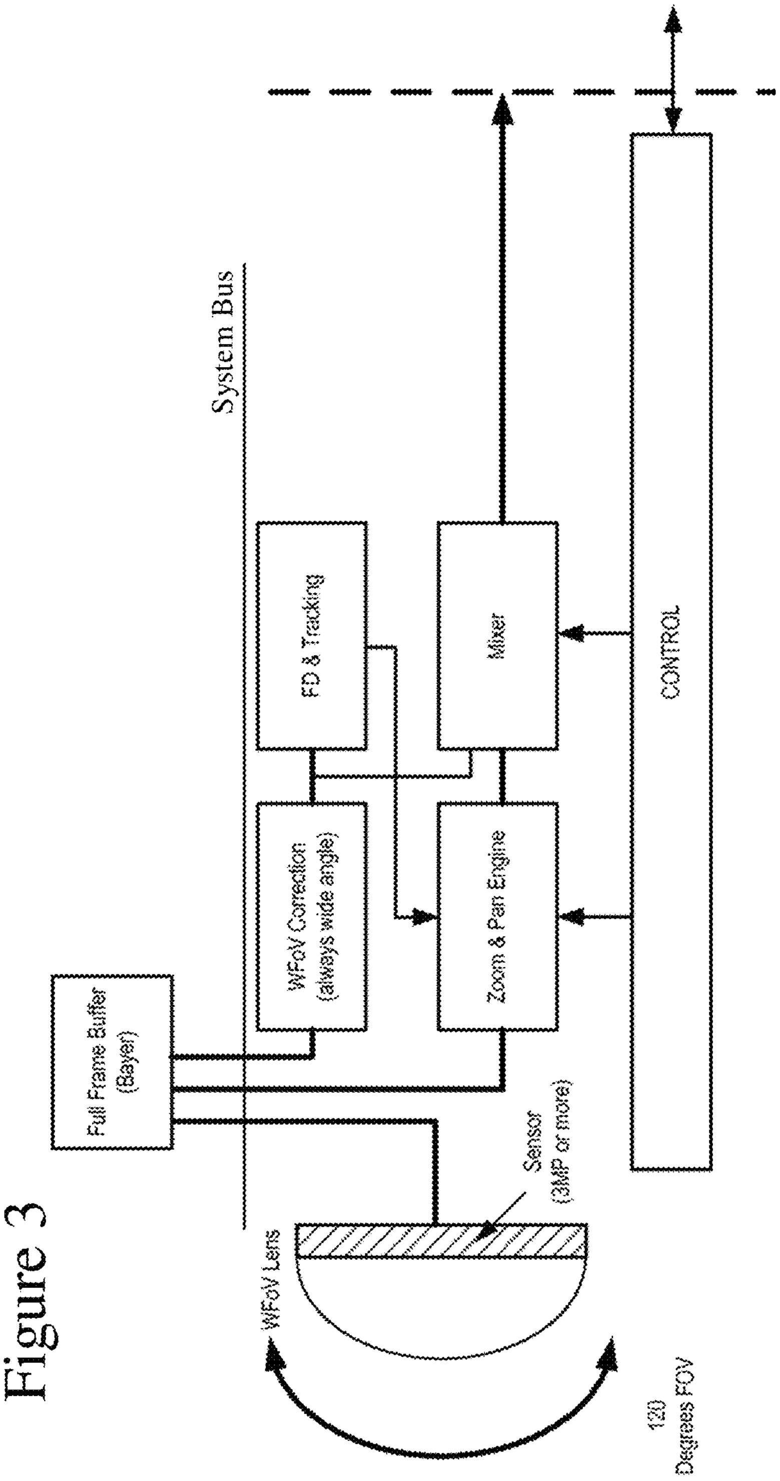
FIG. 3 shows schematically a digital image acquisition device for acquiring and processing a succession of images.

In the present description, Local Grid relates to the area of interest within field of view where the image is to be corrected for example for subsequent display. So for example, if in an image stream, a face detector (FD) such as shown in FIG. 3, detects a face region within a field of view, an application fed from the FD could decide that a (rectangular) region bounding this face represents a region of interest. The coordinates defining this region are then written to a "Local Grid" region of DRAM and this region will be processed by the GDE. Thus, in this embodiment, for any given frame, at least one Local Grid must be stored in memory defining a region of the field of view which is to be corrected. As a face moves across the field of view of the camera, the Local Grid can be shifted from frame to frame. Equally, if more than one face is detected, more than one Local Grid will be stored in memory and each Local Grid will be processed by the GDE in turn (as such the description of the processing of each Local Grid can be treated independently).

The corrected grids of the complete image could for example be displayed superimposed over the remaining portions of the image, so that for example faces which are detected at the extreme edges of the field of view of a WFOV lens system can be displayed undistorted.

The Affine Transformation enables the GDC to correct either for example, for movement from frame to frame or indeed to compensate for changes or misalignment between lens and image sensor (Global Affine); or for example, distortion caused by rolling shutter (Local Affine). Thus, in the case of local affine transformation, the mapping of node locations from one portion of the Local Grid of an input image to the output image could be different from the mapping from another portion of the Local Grid and this is implemented by specifying sequences of nodes for which given transformations apply as will be explained in more detail below.

Figure 2:
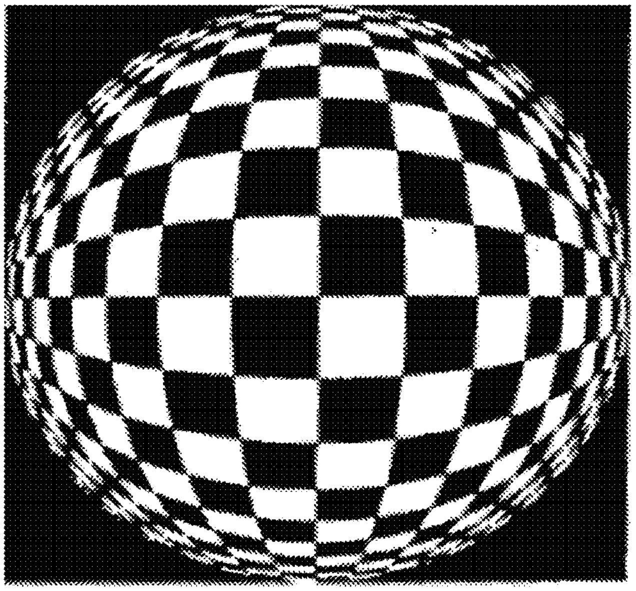
FIG. 2 shows a notional distortion pattern introduced by a prior art WFOV lens system.

The Global Transformation is in general fixed for a given lens. For a typical WFOV lens, the transformation takes into account the deviation caused by a given lens away from a nominal mapping of field of view to an image sensor such as shown in FIG. 2. For a zoom lens, the Global Transformation is fixed for a given focal length; or for a lens such as used sometimes in a security camera where the image sensor can rotate relate to the lens system, the Global Transformation is fixed for a given angle of the image sensor to the lens system. This mapping is therefore stored within the GFU where it is only rarely updated or, except in the case of a zoom lens, it is at least unlikely to be updated on a real-time frame-by-frame basis as an image stream is captured.

Referring back to FIG. 4, an output formatter takes corrected image tiles (of in) and writes these into Output Images in bursts back to the DRAM memory.

Extra "Out Tile" processing blocks can be inserted between the GDC and the output formatter. In embodiments, the output format of each GDC is in a standard frame format so each tile output by the GDC can be treated as a separate image, meaning that any "Out Tile" processing block that has a frame interface input/output can be inserted between the GDC and output formatter. The extra processing blocks can be any blocks that process a pixel deep image stream, for example gamma correction, colour enhancement or high dynamic range processing. They can also be blocks where a second image source is needed, for example, for alpha blending.

Figure 5:
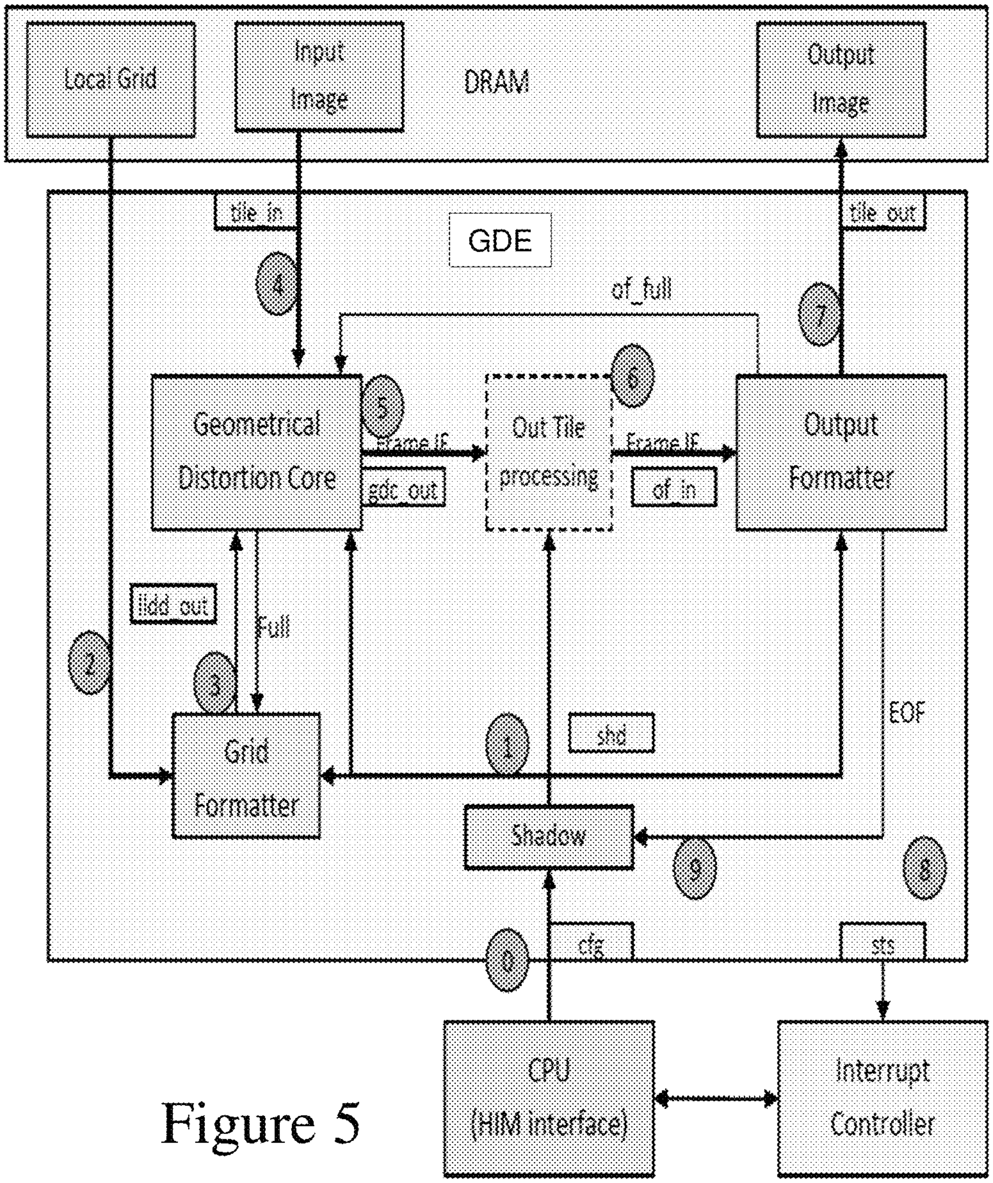
FIG. 5 shows data flow within the GDE of FIG. 4.

Referring now to FIG. 5, which shows the operation of the GDE for a given image plane in more detail:

0 The CPU programs the GFU and the other blocks.

1 When the GDE block is enabled, the configuration from the CPU is copied into internal shadow registers via the cfg interface. The main purpose of the shadow registers bank is to provide constant configuration inputs to the internal GDE blocks during processing of a given image frame while allowing the CPU to prepare the configuration for the next image frame. As such the contents of the shadow registers are in general stable for the whole processing time of a frame.

Figure 1:
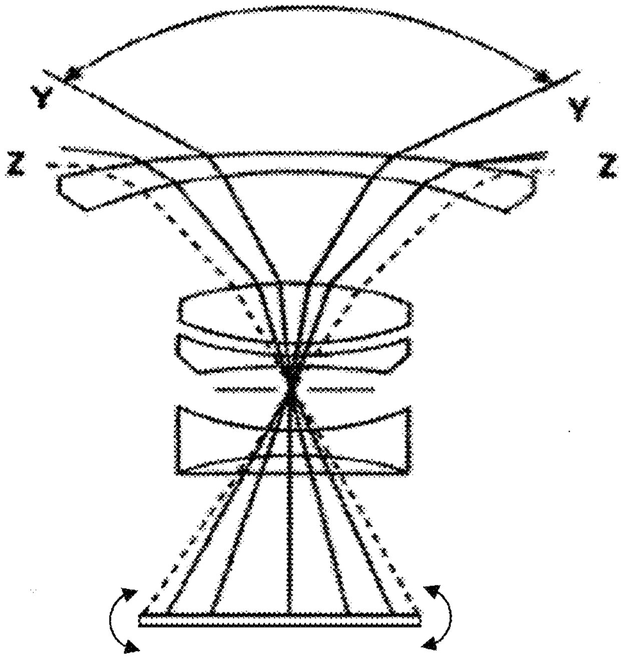
FIG. 1 shows schematically a prior art WFOV lens system.
Figure 6:
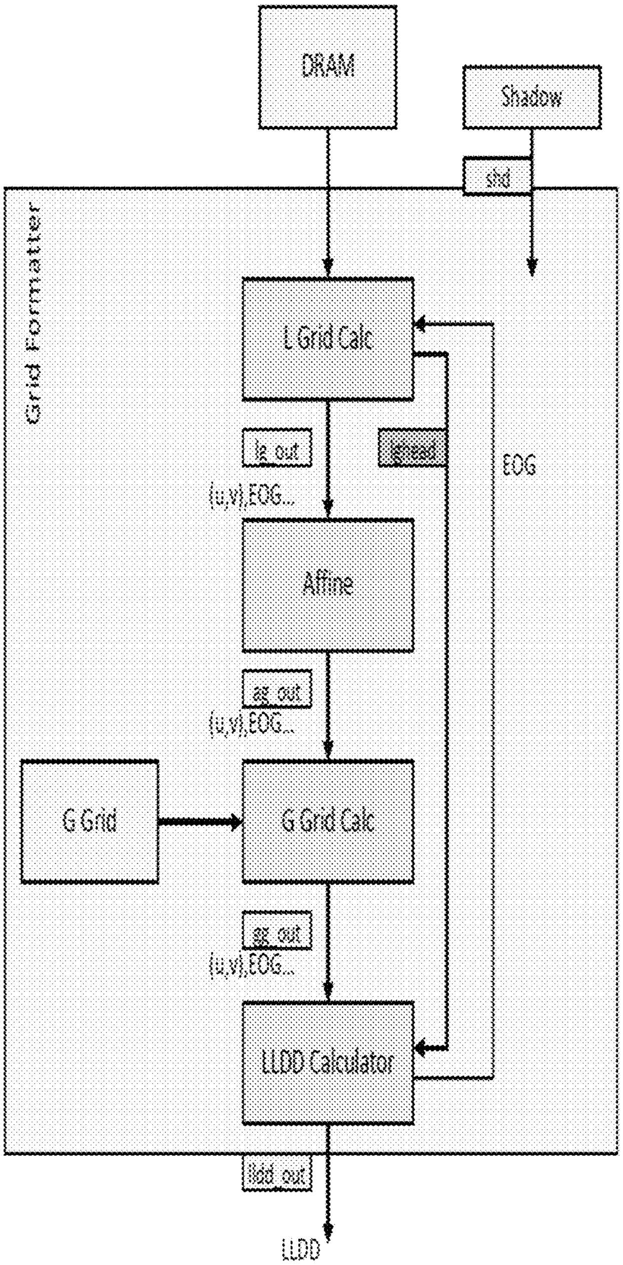
FIG. 6 shows the structure of the Grid Formatter (GFU) of FIG. 4.
Figure 7A:
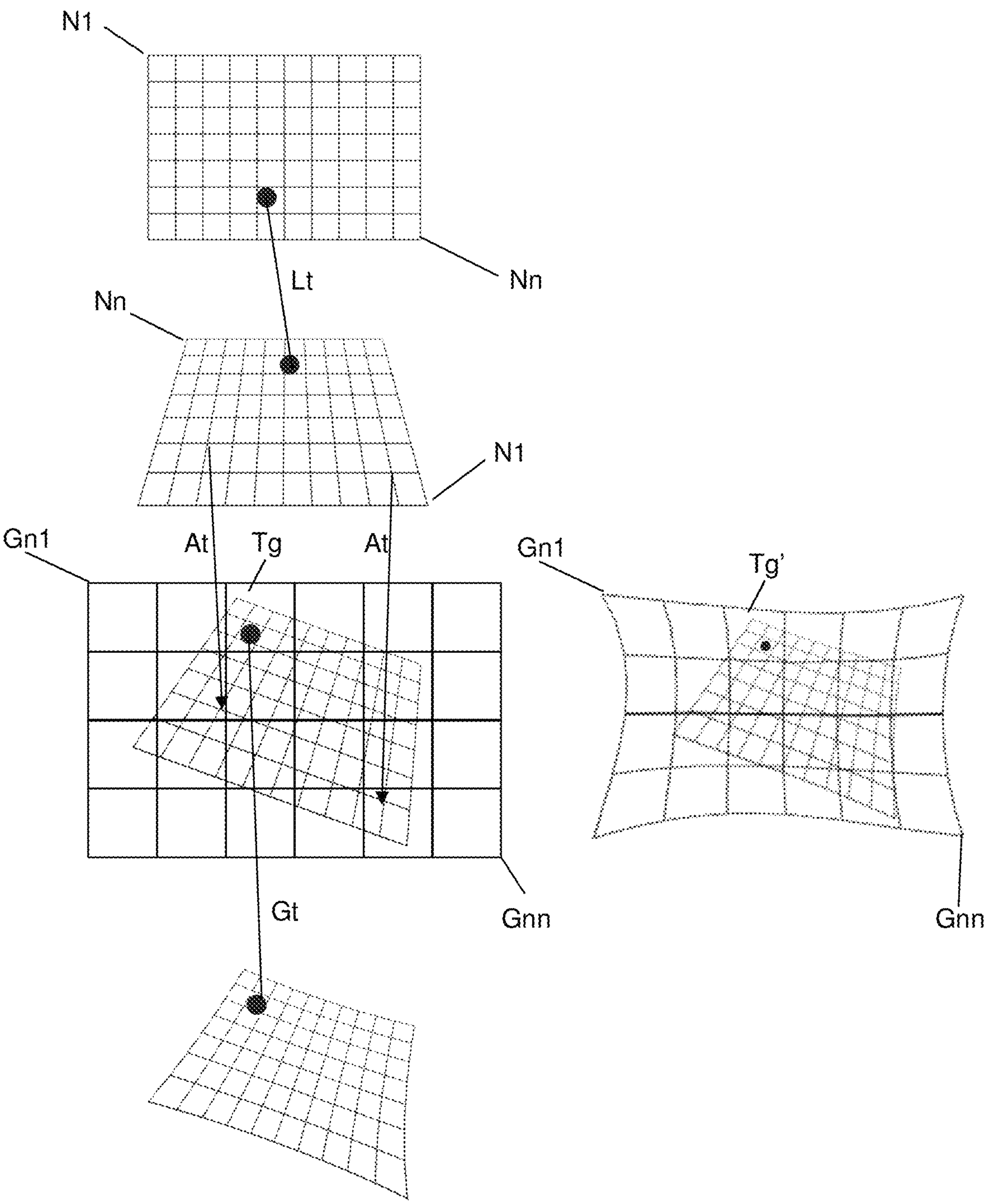
FIG. 7(*a*) shows tile transformation.
Figure 7B:
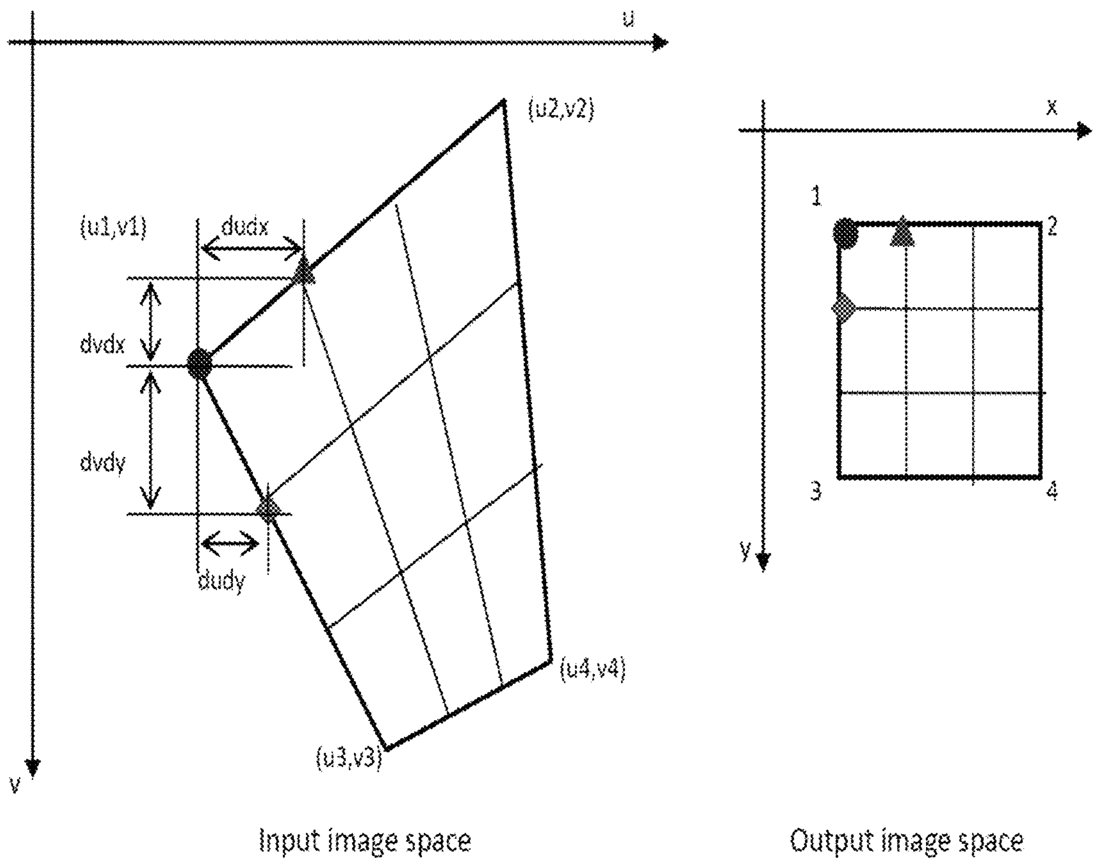
Figure 7C:
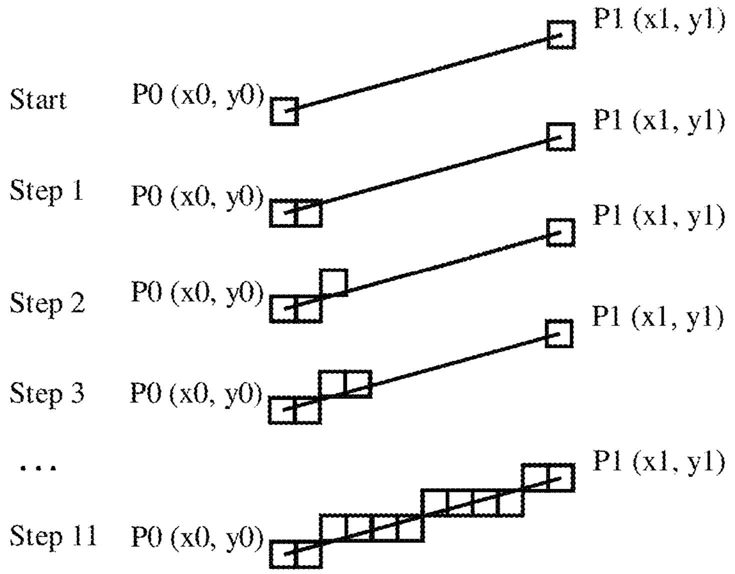
Figure 7D:
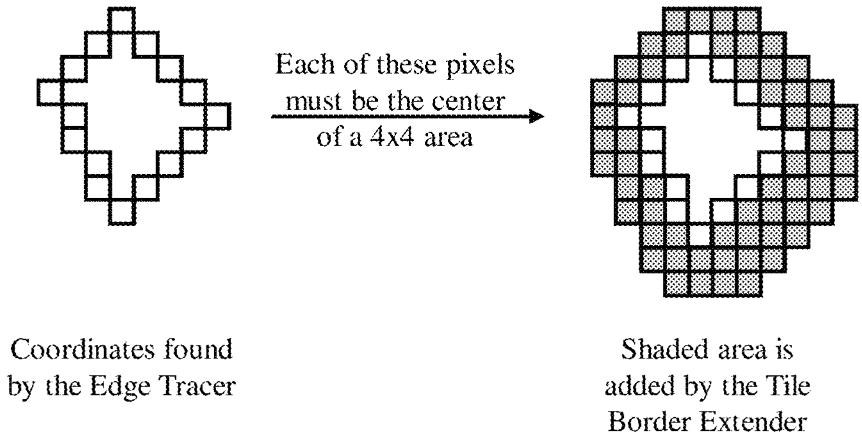

2 Referring to FIG. 6, the GFU fetches a local grid header from the DRAM. The header contains information about local grid location in the output image space, grid dimension expressed in number of nodes, and the single cell (tile) size. The output image grid is rectangular and so this information is enough to describe the whole local grid in the output image space. The header is followed by the nodes containing coordinates in the input image space and variations in those coordinates describe the distortion associated with the local grid. So referring to the example of FIG. 7(*a*), the local grid transformation (Lt) defines for each node of the Local Grid, the change in node coordinate information. In the example of FIG. 7(*a*), the local grid comprising nodes N1 . . . Nn undergoes a flip and perspective transformation and so could compensate for varying rotation of the image sensor relative to the lens assembly such as illustrated in FIG. 1 as well as for simulating or compensating for a mirror view. So we can see node N1 moves from the top left to the bottom right and vice versa with node Nn, and that the transformed top of the local grid becomes more compressed than the bottom. The effect of the local grid transformation on the geometry and location of a specific tile is also illustrated. Also, the local grid transformation can compensate for varying distortion caused by changes in perspective for different local regions within an input image—particularly in the case of WFOV systems. Thus, the local grid can help to compensate for the greater degree of distortion found in faces at the edge of a wide field of view vis-à-vis those located (or detected) at the centre of the field of view.

Values from the local grid header are used by L Grid Calc to setup registers responsible for accessing the local grid information from DRAM. After this, the GFU starts to read local grid node coefficients from DRAM one by one. The transformed coordinates for the grid nodes are then passed to an Affine block (if enabled). In the embodiment, the Affine block multiplies input node coordinates u,v by a 2×3 matrix comprising coefficients a1 . . . a6 of the Affine Transformation (At) in order to produce output coordinate values u',v':

$$\begin{bmatrix} u' \\ v' \end{bmatrix} = \begin{bmatrix} a1 & a2 \\ a3 & a4 \end{bmatrix} \begin{bmatrix} u \\ v \end{bmatrix} + \begin{bmatrix} a5 \\ a6 \end{bmatrix}$$

In an alternative implementation, the above Affine transformation can be extended to provide an extended transformation which can correct for perspective. Here, the transformation block multiplies input node coordinates u,v by a matrix comprising coefficients a1 . . . a9 in order to produce output coordinate values u',v':

$$\begin{bmatrix} u' \\ v' \end{bmatrix} = \left( \begin{bmatrix} a1 & a2 \\ a3 & a4 \end{bmatrix} \begin{bmatrix} u \\ v \end{bmatrix} + \begin{bmatrix} a5 \\ a6 \end{bmatrix} \right) * D$$

where D=1/(u*a7+v*a8+a9). Thus, if a7=a8=0 and a9=1 the transform is an affine transform as above. In other cases a7 and a8 can be varied with a9 fixed and equal to 1. However, enabling a7, a8 and a9 to be varied provides for the most flexible solution.

In still further implementations, the affine transformation can be adapted to correct for two perspective transformations, using a homography matrix with suitably defined coefficients.

The values of those matrix coefficients a1 . . . a6 and possibly a7, a8 and/or a9 are stored in the registers internal to the GFU. These internal GFU registers holding coefficient values can be programmed twofold: in a first mode, Global Affine Transform mentioned above, they can be programmed by the CPU before the start of the frame processing and their values are kept constant for all local grids of a whole frame; and in the second mode, Local Affine Transform, values of the shadow registers are read from DRAM together with a node index that indicates when a new set of affine transformation coefficients must be loaded. For example, if a first set of node coefficients is loaded together with an index 100, this transform is applied to the nodes 0 to 99 and before node 100 is processed a new set of transformation coefficients is loaded from DRAM and applied to the subsequent nodes until the next change is indicated. As mentioned above, the second mode allows for dynamic transformation updates and correction for example, of rolling shutter distortions together with camera shake compensation. Thus, it will be seen that in this example, the Affine Transformation comprises a formulaic transformation of node coordinate locations from the local transformation (Lt). In the present example show in FIG. 7(*a*), the affine transformation (At) comprises a global affine transformation rotating the entire grid and so could compensate for a rotational misalignment in a plane parallel to the plane of the image sensor between lens and image sensor.

The coordinates that are produced by the Affine block of FIG. 6 are then passed to the global correction block G Grid Calc. This block applies warping distortion to the input local and/or affine transformed node coordinates with the distortion defined by means of a regular grid of nodes (G in FIG. 7(*a*)) with nodes distributed regularly in the input coordinates space and the values stored in the nodes point to locations on the sensor image space. This provides mapping from the regular to distorted coordinate system with intermediate coordinate values (not belonging to the grid nodes) obtained using bi-cubic interpolation. The values of the coordinates of the global grid nodes are stored in the internal registers and can be updated after the end of each frame to allow for dynamic changes to the correction for lens distortion that is required in case of zoom lenses where distortion changes shape with change of the focal length. The final node coordinate values from the global transformation are passed to the LLDD Calculator input queue.

So again referring to the example of FIG. 7(*a*), the global transformation (Gt) comprises a mapping of node coordinates Gn1 to Gnn of a Global Grid for example to take into account lens distortion. For a given node coordinate after Affine Transformation (At) and or Local Grid transformation (Lt), G Grid Calc finds the nodes of the Global Grid surrounding that location and interpolates the mapping of those nodes of the Global Grid tile to the node of the local and/or affine transformed node of the local grid to determine the Global Transform (Gt) of that node location. In the example of FIG. 7(*a*), for nodes within the tile Tg of the global grid, the mapping of the coordinates of the tile Tg to the transformed file Tg' is interpolated and applied to local and/or affine transformed node coefficients to finalise the transformation of the original node coordinates. Thus for any node N, the complete transformation becomes Gt(At(Lt(N))).

When the LLDD Calculator input queue contains a number of nodes equal to grid width+2 (a full tile), it uses them to prepare an LLDD descriptor that contains a full definition of the input tile. The definition contains location of the tile on the sensor image and partial differences that will be used by an address calculator (FIG. 8) to calculate locations of all the pixels belonging to this particular tile. The complete LLDD descriptors are loaded to the LLDD FIFO (lldd_out).

3 Referring back to FIG. 5, the GFU fills the LLDD FIFO of the GDC with descriptor data for each tile to be processed 4 The GDC fetches the input image tile by tile, with a new tile for every LLDD FIFO entry.

5 The GDC processes each tile and outputs the corrected tiles in frame interface format. A backpressure signal path from the output formatter to the GFU enables the GFU to stall the GDC if the output formatter is full.

6 Optional processing algorithms can be applied on the GDC corrected tiles.

7 The output formatter writes the corrected tiles (tile_out) of the output image into the memory.

8 When processing of a given Local Grid tile is completed and when the frame is completed, the output formatter signals this using an interrupt signal provided through a status interface (sts) to an interrupt controller.

9 If the GDE is still enabled when the frame is completed (EOF), the shadow register values are updated for the next frame.

Referring to FIG. 6, as indicated above, the GFU combines basic local grid information obtained by the L Grid Calc block from DRAM, affine transformation matrix and the global distortion grid information stored within the block G Grid and obtained from the Shadow Registers and generates the LLDD descriptor information for each tile.

When the GFU is enabled, the L Grid Calc block starts reading the local distortion grid (defining Lt in FIG. 7(*a*)) from the Local Grid information in DRAM. There must be at least one local grid for a frame—otherwise whatever application is running in the acquisition device has determined that there is no particular region of interest where distortion correction is required, for example, no faces have been detected or are being tracked. Multiple local grids are stored one after another in the memory, each local grid comprising a header followed by the nodes of the grid that contain points coordinates in the distorted image space.

The Affine transformation block applies a user defined affine transformation (At in FIG. 7(*a*)) to the (u, v) coordinates produced by the L Grid Calc block. The Affine block performs a simple affine transformation on the (u,v) coordinates from the L Grid Calc block. As described at step 2 above, the Affine block has two operating modes where a) the affine coefficients are taken from the internal GFU registers corresponding to the shadow registers meaning that they are constant through the frame; and b) the coefficients are taken from the internal GFU registers and can change during the frame.

The G Grid calculation block calculates the final distorted grid, by performing spline interpolation based on the global grid points (Gn in FIG. 7(*a*)) obtained from G Grid.

When reading the last node of the last tile of the current local grid, L Grid Calc asserts an End of Grid (EOG) flag. The grid coordinates in input space (u,v) and output space (x,y) together with the EOG flag are sent to the next block in the pipe—in this case Affine. The next blocks in the pipe (Affine, Global Grid calculation) use the same interface, meaning that the Affine or the Global Grid Calculator blocks can be swapped or removed from the pipeline. The (u,v) coordinate is processed by the Affine and Global Grid calculator—other image fields in the header are passed down the pipeline unchanged.

The final distortion descriptors for each tile of the grid are calculated by an LLDD Calculator. The LLDD Calculator block combines the header information provided on an Ighead interface with the descriptor fields and sends them on the lldd_out interface. The L Grid Calc block does not start processing a new grid until the LLDD Calculator block signals with an EOG signal that the last tile of the current grid is processed. This ensures that the signals on the Ighead interface are constant for all tiles of a local grid.

FIG. 7(*b*) shows a tile in the output (right) and the input (left) image space. For exemplary purposes, the tile contains 4×4 pixels. The LLDD Calculator gets the coordinates of the four corners (u1,v1) to (u4,v4) and calculates the partial differences (dudx, dvdx, etc) needed by an addresser within the GDC for the linear interpolation of each pixels (u,v) coordinates. As indicated above, knowing the various transformations required to compensate for camera, movement and user determined distortion, the LLD calculator can determine the required area of input image space defined by (u1,v1) . . . (u4,v4) to bounded output image space defined by nodes 1, 2, 3, 4.

However, when interpolating input image data to calculate output image values, data for points outside the boundary defined by the vertices (u1,v1) . . . (u4,v4) can be required.

The LLDD Calculator could therefore be used to determine the memory addresses corresponding to the tile border and to extend the memory addresses around this border for each tile using for example, a variation of Bresenham's line algorithm.

FIG. 7(*c*) shows an example of the steps performed by such an LLDD Calculator module. Here, the module takes the first and last point of each edge (u1,v1 and u2,v2; u2,v2 and u4,v4 etc) and computes (one by one) the coordinates of the pixels located on the line that is described by those 2 points.

Each edges (x,y) coordinates are analyzed and the minimum and maximum x coordinates of each line in DRAM from which tile information is to be read by the GDC are stored in respective memories Max and Min. The y coordinate represents the memory address. After an edge tracer within LLDD Calculator finishes all 4 edges of a tile, it sends a ready indication to a tile border extender module within LLDD Calculator. This extender module extends the start/end coordinates produced by the edge tracer. The extension is needed because a 4×4 pixels area is needed around each pixel and the coordinates computed by the edge tracer must be changed to include all the pixels needed. The extender module reads the 2 memories Max and Min and determines the final start/end coordinates of the pixels of each line of the tile as shown in FIG. 7(*d*).

Thus, the above LLDD Calculator takes transformed node coordinates for a tile provided by G Grid Calc (or indeed any of the previous transformations) and provides the non-rectangular strips of memory addresses running from Min to Max for each line of the input image for a tile to be read from memory by the GDC when correcting the input image.

In an alternative implementation, rather than providing the actual memory addresses to be read by the GDC, LLDD Calculator simply provides the tile descriptor information illustrated in FIG. 7(*b*) and the tracing/extending functionality described above for converting this descriptor information to memory addresses is implemented within the GDC as described below.

Figure 8:
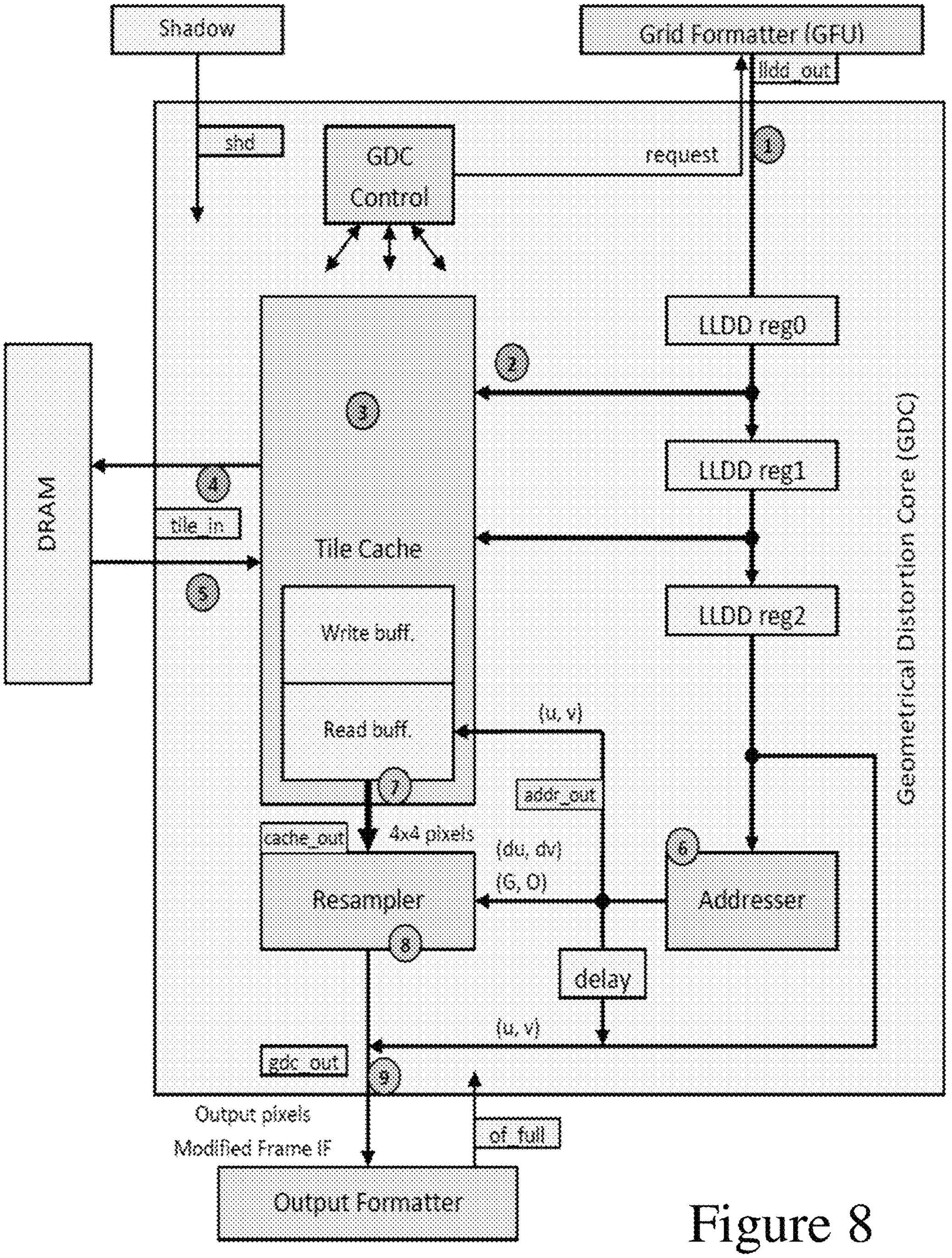
FIG. 8 shows the structure of a Geometrical Distortion Core (GDC) of FIG. 4.

Referring to FIG. 8, there is shown a block diagram of the Geometrical Distortion Core. The main sub-blocks are:

Geometric Distortion Core (GDC) Control—the main control sub-block

LLDD Registers—Low Level Distortion Description Registers. Each time the LLDD for a new tile is requested from the GFU, these registers are shifted. There are two such registers as there can be data for up to three tiles in the pipe at one time.

Tile Cache—a double buffered cache which contains a Burst Calculation module (not shown) which calculates the burst accesses needed to fill the tile cache and load the cache with data from the DRAM Addresser—for each pixel in the output tile (in raster order), it calculates:

- coordinates of the 4×4 pixels window from the required from the Tile cache
- sub-pixels (dx,dy) for the Resampler
- color offset and gain for the resampler output Resampler—a bicubic resampler which produces an interpolated pixel value from a 4×4 pixel input.

Referring to the steps indicated in FIG. 8, the GDC operates generally as follows: Prepare input tile and load to Tile Cache:

1 The GDC control block requests a new distortion descriptor LLDD for a tile. In this example, it is assumed that LLDD Calculator provides descriptor information as shown in FIG. 7(*b*) from the GFU and memory addresses are calculated by the Tile Cache;

2 Once the pipeline allows a new tile to be prepared, the Burst Calculation module within the tile cache starts working on the LLDD descriptor data from the GFU;

3 The Burst Calculation module calculates one by one the burst requests for the tile;

4 The Burst Calculation module requests the burst data from the DRAM based on LLDD information;

5 The Burst data is received from the DRAM and written to the Tile cache.

Process Tile:

6 For each output tile pixel, the addresser calculates the address of each 4×4 pixels block and the parameters for the Resampler 7 The 4×4 pixels window is fetched from the Tile Cache 8 The Resampler calculates the resampled output pixel 9. The signals for the gdc_out interface are assembled together. It contains:

- pixel data from the Resampler
- Frame control signals from the addresser
- Tile control signals from the LLDD FIFO
- Output local grid information from the Ighead register Referring to steps 7 and 8 above, in the embodiment of FIG. 8, the output tile is scanned in raster order and, for each pixel of the output tile, the re-sampler acquires a window of 4×4 pixels from the tile cache in order to perform a bi-cubic interpolation of those pixel values and to generate the pixel value for the output tile.

Figure 9:
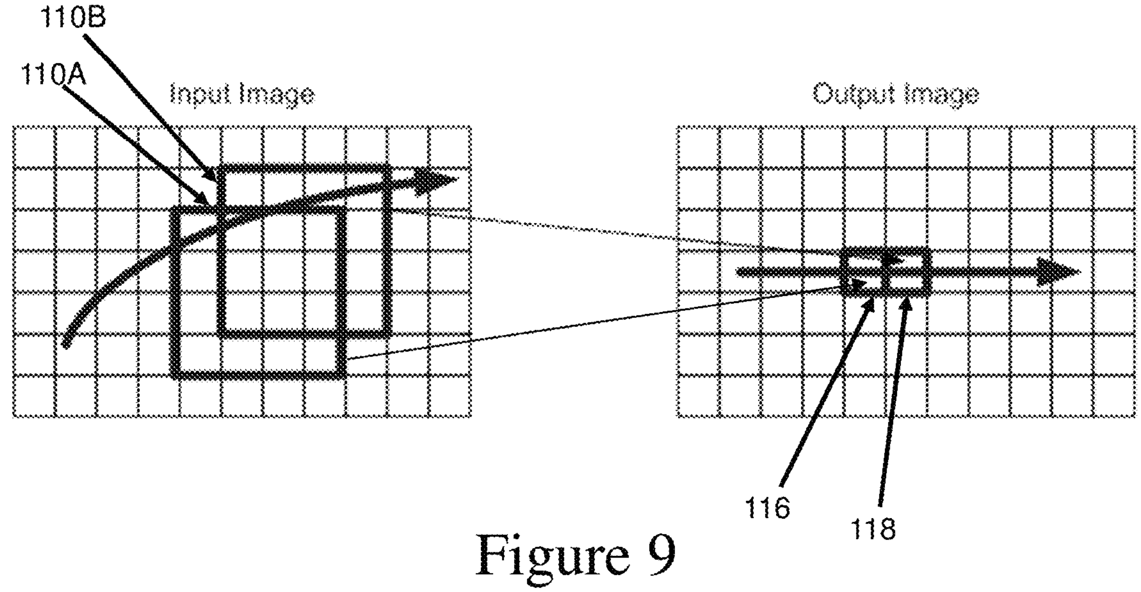
FIG. 9 shows tile cache pixels used to generate output image pixels in one embodiment.

FIG. 9 illustrates an output image being scanned from left to right and the corresponding 4×4 pixels 110A, 110B from the tile cache which need to be interpolated to provide respective values for two successive pixels 116,118 of the output image. Note the vertical displacement of the tile windows 110A, 110B in the tile cache relative to those of the output image to take into account image distortion.

In one embodiment, the tile cache is arranged as 8 interleaved SRAMS to enable the 4×4 window to be read from the tile cache in a single clock cycle and thus, with a hardware interpolator, each output file pixel can be produced in a single clock cycle.

Figure 10:
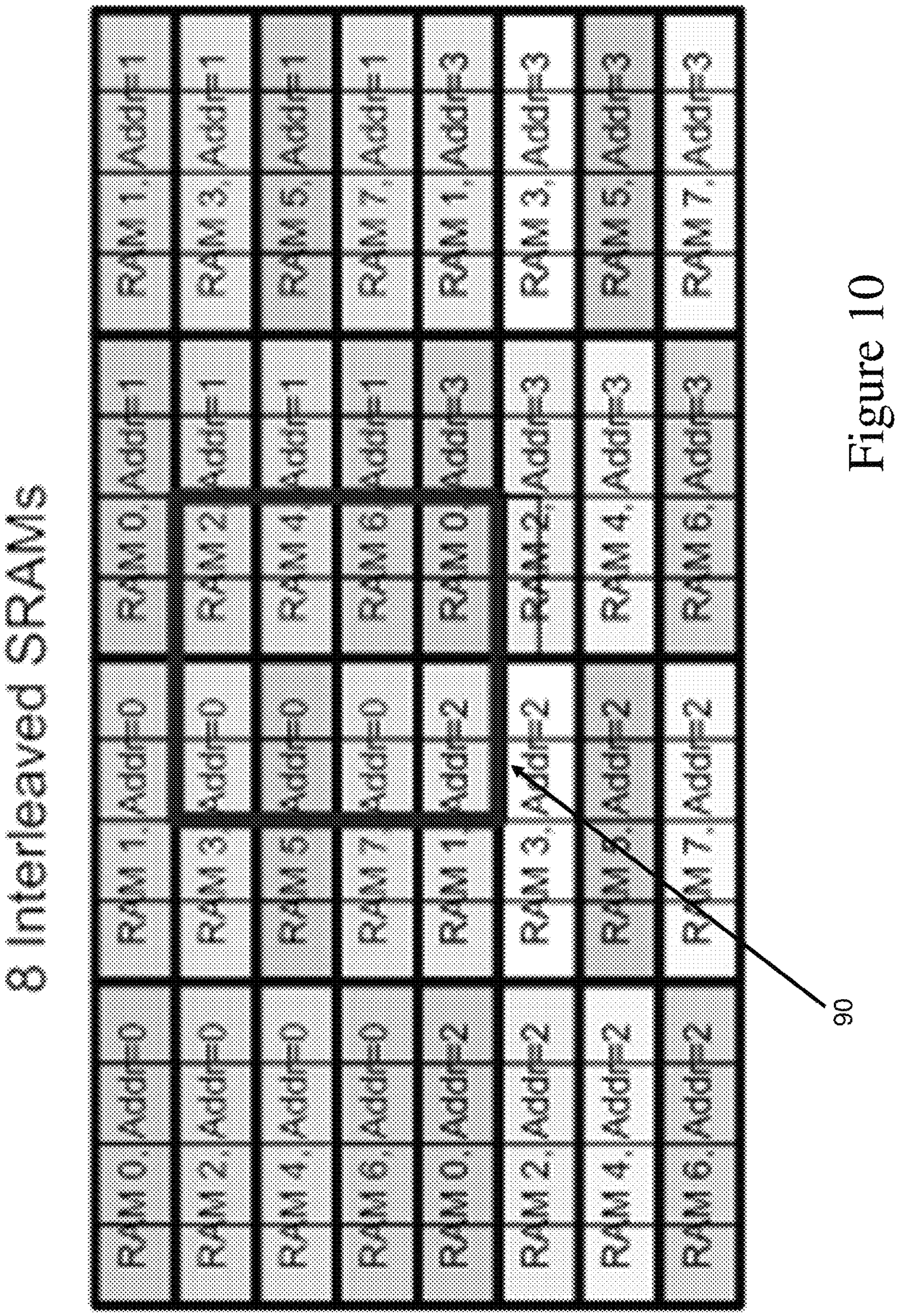
FIG. 10 shows an example of interleaved memory employed in one embodiment.

FIG. 10 shows a portion of the input image stored in the tile cache. The tile cache is organized with interleaved memories in such a way that a 4×4 window of pixels can be read from any (x,y) location in one cycle. In this example the cache is organized with 8 interleaved memories and the image is stored as indicated in FIG. 10. The data bus of each memory is 32 bits wide and each pixel comprises 8 bits of information. Thus, each memory word stores information for 4 adjacent pixels. With eight parallel read operations (one for each memory: RAM0 to RAM7) 32 pixels can be read in one clock cycle.

Highlighted region 90 indicates that the 4×4 window for a particular output tile pixel can be read in one clock cycle by reading in parallel from the eight memories: from RAM3 (Addr=0), RAM2(Addr=1), RAM5(Addr=0), RAM4 (Addr=1), RAM7(Addr=0), RAM6(Addr=1), RAM1 (Addr=2), RAM0(Addr=3); and it will be seen that reading a 4×4 window from any location is always possible in one clock cycle as for each memory no more than one read from one address is needed. (It can be noted that with this interleaved memory structure half of the read pixel values are not used.)

It is of course always desirable to increase throughput when image processing and by, for example, doubling the tile cache and providing a pair of interpolators along with suitable multiplexing to select the correct pixels from each memory instance, it could be possible to process two pixels of the output image in a given clock cycle.

Another approach is based on being able to switch between bi-cubic and bi-linear interpolation when either quality or speed respectively become a priority.

Figure 11:
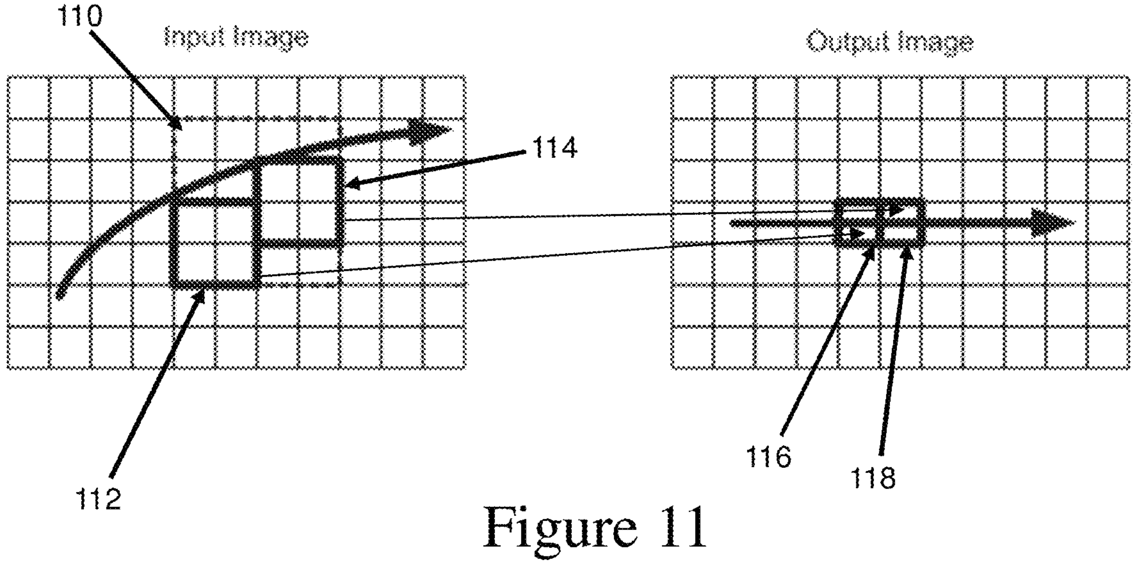
FIG. 11 shows tile cache pixels used to generate output image pixels in another embodiment.

Referring to FIG. 11 it will be seen that for bilinear interpolation, only a window of 2×2 pixels from the tile cache is required for generating each pixel of the output image. It will also be noted that as long as down-sampling from the from the tile cache input image to the output image does not exceed 2×, any given 4×4 window from the tile cache will include sufficient information to enable 2 adjacent pixels of the output image to be interpolated.

In this embodiment, as well as a bi-cubic interpolator, the re-sampler comprises a pair of bi-linear interpolators (not shown). Note that in order to implement a bi-cubic interpolator in hardware, approximately 10 k gates are required, whereas each bi-linear interpolator comprises approximately 1 k gates. The GDC controller of FIG. 8 is therefore arranged to signal to the re-sampler to switch between high quality but lower speed bi-cubic interpolation and lower quality, but higher speed bi-linear interpolation.

When in bi-linear interpolation mode, the re-sampler again scans across the output image tile in raster order, but in this case, it does so, two pixels at a time. For each pair of adjacent pixels, such as pixels 116,118, the re-sampler acquires a 4×4 window 110 from the tile cache.

For the pair of pixels of the output image highlighted in FIG. 11, the respective bi-linear interpolators would acquire the 2×2 blocks 112 and 114 from the 4×4 window 110 read from the tile cache to produce the output image pixel values. Thus, any window such as the window 110 containing these 2×2 blocks can be read from the tile cache to enable the pair of output image pixel values 116, 118 to be generated in tandem within a given clock cycle.

In one example, the re-sampler is hardwired so that depending on the relative location of the 2×2 windows 112, 114, an appropriate bounding window 110 is chosen. In one implementation, the minimum x and y coordinates of the two 2×2 windows 112, 114 provides the corner coordinate of the 4×4 window 110. In any case, there are a limited number (9) of possible locations of one window, say the window 114, relative to the other, say the window 112, within a 4×4 window; and appropriate logic can be employed to ensure an appropriate 4×4 window is acquired for any pair of output image pixels. This logic can in turn be rationalised by making certain assumptions, for example, that the window 114 for a successive pixel would never be located to the left of a window 112 for a previous pixel.

Thus, it will be seen that for an increase in interpolator hardware of the order of 20%, a doubling of image processing speed can be selectively provided for a minimal loss of image quality.

It will therefore be seen from the above description that embodiments of the present invention provide an efficient mechanism for performing complex distortion compensation on an input image in a processor and memory efficient manner with minimal demands on the system bus.

It will be appreciated that the illustrated embodiment is provided for exemplary purposes only and that many variations of the implementation are possible. For example, some functionality shown as being implemented in one module could be migrated to other modules.

In the illustrated embodiment, tiles have been described as rectangular and defined by four nodes. However, it will be appreciated that although more complex, the invention could also be implemented with non-rectangular tiles defined by 3 or more nodes; and indeed the local grid need not be defined by a uniform array of tiles, these could in certain applications be non-uniform.

The invention is not limited to the embodiment(s) described herein but can be amended or modified without departing from the scope of the present invention.

What is claimed is:

1. An image acquisition system comprising:
- a first memory for storing at least a portion of a distorted input image acquired from an image sensor and a lens system;
- a second memory for storing a corrected output image; and
- an interpolator module connected to said first memory for reading distorted input image information and to said second memory for writing corrected output image information, said interpolator comprising: a bi-cubic interpolator; and a pair of bi-linear interpolators and being switchable between a first high quality mode and a second high speed mode where,
- in said first high quality mode, for each pixel for said output image, said interpolator is arranged to read a 4×4 pixel window from said first memory and with said bi-cubic interpolator to interpolate said 4×4 pixel window to provide said output pixel value, and
- in said second high speed mode, for each pair adjacent output pixels for said corrected output image, said interpolator is arranged to read a 4×4 pixel window from said first memory, said 4×4 pixel window bounding a pair of 2×2 pixel windows, each of which are interpolated in parallel by said pair of bi-linear interpolators to provide said output pixel values.

2. An image acquisition system according to claim 1 wherein said interpolator module is configured to select a minimum x and a minimum y value of said pair of 2×2 pixel windows as a minimum x,y value for said 4×4 pixel window.

3. An image acquisition system according to claim 1 further comprising a distortion correction module incorporating said an interpolator module and wherein said first memory comprises a cache memory within said distortion correction module, said system further comprising a system bus connecting said distortion correction module to a system memory arranged to store each of said distorted input image and said corrected output image.

4. An image acquisition system according to claim 1 wherein said first memory comprises a plurality of N interleaved memories, said memories being arranged so that said 4×4 pixel window can be read from said memories in a single clock cycle.

5. An image acquisition system according to claim 3 further comprising:

a formatter configured to:

a) divide a local region of an image to be displayed into an array of tiles, each tile having a boundary defined by a plurality of nodes, each node having a set of coordinates within an image space;

b) for each tile of the local region, transform node coordinates according to at least a first local transformation to take into account a local distortion of said input image in said local region;

wherein said distortion correction module is configured to, for each tile of the local region:

i) read a non-rectangular portion of said distorted input image corresponding to at least locally transformed node coordinates of said tile into said first memory; and ii) correct the distortion of said non-rectangular portion of said distorted input image to provide a tile of a corrected output image.

6. A method for correcting a distorted input image comprising:

a) determining a local region of an image to be displayed and dividing said region into an array of tiles, each tile having a boundary defined by a plurality of nodes, each node having a set of coordinates within an image space;

b) for each tile of the local region, transforming node coordinates according to a first local transformation to take into account a local distortion of said input image in said local region;

c) determining a perspective transformation applicable to at least a portion of the nodes of said local region of an image, said perspective transformation comprising multiplying node coordinates u,v transformed according to said first local transformation with the following matrix transformation:

$$\begin{bmatrix} u' \\ v' \end{bmatrix} = \left( \begin{bmatrix} a1 & a2 \\ a3 & a4 \end{bmatrix} \begin{bmatrix} u \\ v \end{bmatrix} + \begin{bmatrix} a5 \\ a6 \end{bmatrix} \right) * D$$

where D=1/(u*a7+v*a8+a9) to produce transformed coordinate values u',v';

d) transforming at least said portion of the node coordinates of said local region according to said perspective transformation;

e) determining a second global transformation mapping coordinates for a global array of nodes to take into account a global distortion of said input image;

f) for each node of each tile of the local region:

i) determining nodes of the global array immediately surrounding the node;

ii) interpolating a transformation of surrounding global node coordinates to transform the locally and perspective transformed coordinates of the node according to the global transformation;

g) for each tile of the local region:

i) reading a non-rectangular portion of said distorted input image corresponding to the locally and globally transformed node coordinates of said tile;

ii) correcting the distortion of said non-rectangular portion of said distorted input image to provide a tile of a corrected output image; and h) storing said corrected tiles for said output image.

7. A method according to claim 6 wherein matrix coefficients a1 . . . a6 are changed for successive different subsets of nodes of the local region to compensate for rolling shutter distortion.

8. A method according to claim 6 wherein matrix coefficients a1 . . . a6 are changed for different subsets of nodes of the local region to apply a user defined distortion to said input image.

9. A method according to claim 6 wherein matrix coefficients a1 . . . a6 are set to compensate for inter-frame camera shake.

10. A method according to claim 6 further comprising, for each tile of the local region, determining maximum and minimum memory address locations of successive rows of said input image sufficient to span a tile boundary, said maximum and minimum addresses for each of tile the input image corresponding to a non-rectangular region of the input image.

11. A method according to claim 10 further comprising extending the memory locations to be read from each row of said distorted input image to ensure at least four pixels immediately outside a distorted tile boundary are available for correcting the distortion of said tile.

12. A method according to claim 6 comprising acquiring said input image with a wide field of view, WFOV, lens system and wherein said global transformation is arranged to compensate for non-uniformities in said WFOV lens system.

13. A method according to claim 6 comprising acquiring said input image with a zoom lens system and responsive to changing image acquisition focal length, changing said global transformation to compensate for different non-uniformities in said lens system.

14. A method according to claim 6 comprising changing one of said global or said local transformation in response to adjusting an angle of an image acquisition sensor relative to a lens system.

15. A method according to claim 14 wherein said angle comprises a rotation angle about an axis normal to a plane of the image sensor.

16. A method according to claim 14 wherein said angle comprises a rotation angle about an axis parallel to a plane of the image sensor.

17. An image acquisition system comprising:

a memory for storing a distorted input image acquired from an image sensor and a lens system and a corrected output image;

a system bus connected to said memory; and a distortion correction module connected to said system bus for reading distorted input image information from said memory and writing corrected output image information to said memory, said module being arranged to perform the steps of claim 6.

* * * * *